Jan. 30, 1962     W. N. BENNETT     3,018,669
DASHBOARD SHIFT FOR MOTORBOATS
Filed Jan. 26, 1960
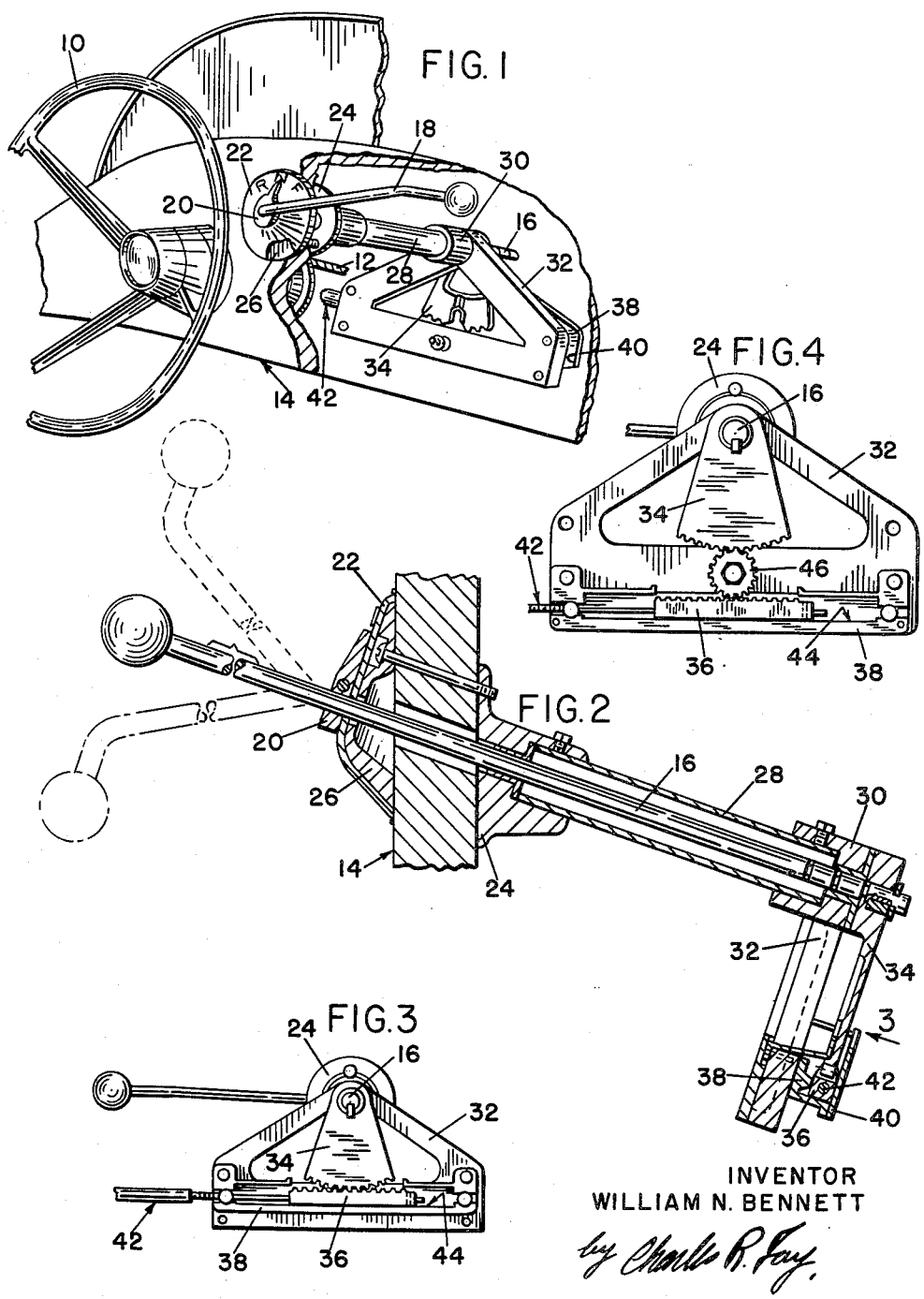
INVENTOR
WILLIAM N. BENNETT
ATTORNEY

United States Patent Office 3,018,669
Patented Jan. 30, 1962

3,018,669
DASHBOARD SHIFT FOR MOTORBOATS
William N. Bennett, County of Sullivan,
Charlestown, N.H.
Filed Jan. 26, 1960, Ser. No. 4,682
7 Claims. (Cl. 74—473)

This invention relates to a new and improved dashboard mounted shift for motorboats, and the principal object of the invention resides in the provision of a device which is extremely easily operated and is mounted adjacent to the steering wheel so as to be operated in substantially the manner of a gear shift for a motor vehicle of conventional type; the provision of a device as above stated which operates with an angular throw or motion which is far less than is usually required by remote shift devices of the prior art; and the provision of a new and improved gear shift for outboard motorboats, the same being quick and easy to mount, easy and smooth to operate, and giving full control of the outboard motor insofar as forward, reverse and neutral is concerned, the same being operable by the fingertips on a second's notice while steering the boat and controlling the same by means of the throttle.

Further objects of the invention provide a natural smooth fingertip control and the close proximity to the steering wheel affords maximum visibility of the shift indicator for safer boat operation with an entire motion of the shifting lever from full reverse through neutral to full forward in the small angle of 60°.

Other objects and advantages of the invention will appear hereinafter.

Reference is to be had to the accompanying drawings, in which:

FIG. 1 is a perspective view with parts cut away illustrating the installation and operation of the new device;

FIG. 2 is a view on an enlarged scale, this view being longitudinal sectional view through the device;

FIG. 3 is a view in elevation of the operating parts of the device; and

FIG. 4 is a view similar to FIG. 3 but showing a modification thereof.

In carrying out the invention, reference is made to FIG. 1 wherein the conventional steering wheel for the boat is indicated by the reference numeral 10. Any means can be used for turning a rudder or the outboard motor itself as by means of a steering cable 12 or the like. These elements can be of any arrangement desired. The dashboard is indicated generally at 14 and the new gear shift lever arrangement is mounted on this dashboard. There is a shaft 16 which extends through the dashboard and terminates in a handle conveniently bent as indicated at 18 and as shown in FIG. 1, this handle is convenient to the operator of the boat who naturally sits in back of the steering-wheel. It will be seen that the arrangement of the bent portion 18 of shaft 16 is quite similar to the steering column mounted gear shift lever of a conventional automobile.

The shaft 16 may be provided with a fixed pointer 20 to cooperate with a disc 22 which includes the notations "R," "N" and "F" for "reverse," "neutral" and "forward," and the apparatus is preferably mounted in rigid condition relative to the dashboard 14 by a pair of plates or brackets 24 and 26 through which the shaft extends and which mount and secure a sleeve 28 through which shaft 16 extends.

The sleeve 28 extends into a boss 30 on a more or less triangular base or plate 32 and at its outer end is connected to a pinion or sector-gear 34 which meshes directly with a rack 36 slidably mounted in a guideway in a removable panel 38. A cover member 40 may be utilized to cover and protect the gearing, but it will be clear that as the shift lever is operated throughout a very short arc, it will cause an increased sliding rectilinear motion of rack 36 to which is secured the cable to the motor as indicated generally at 42. This cable can be connected to either end of the rack 36 or at both ends thereof, and it is connected to the gear shift arrangement found on the usual outboard motor.

The panel 38 comprises essentially a guideway at 44 for reception of the rack 36, and these parts are interchangeable for accommodating the cables of different manufacturers, so that it will be seen that any outboard motor or other motor can be accommodated by this arrangement. It is extremely simple and easy to shift into either "forward" or "reverse" from the "neutral" position by a 30° angle shift from neutral, and therefore the control of the boat is essentially the same as that of a vehcile with which most people are familiar, so that it is very easy to learn to operate a high-speed boat by the use of the gear shift lever and the placement thereof as described herein.

Gear shift levers of the prior art ordinarily require about a 120° total motion, and it will be seen that by the use of the construction herein, this motion is cut in half, making the same operate a good deal smoother and of course faster, so that the boat is under better control than heretofore.

In FIG. 4, there is shown a pinion at 46 which may be interposed between the sector-gear 34 and the rack 36 as an alternative construction. This pinion 46 reverses the direction of flow of the rack if this should become necessary.

The panel 38 and cover 40 are detachably secured by any desired means to the triangular base member 32, and it will be seen that it is a very simple thing to take the parts apart and to assemble them into the position shown in FIG. 1 to accomplish the purpose of changing the gears of the motorboat, particularly in the outboard type.

Furthermore, the rack 36 can be utilized to operate electric switches, solenoids, etc. for those motors which have the change of gear operated by electrical means, and of course in this case there would be an electric cable to the motor and when the rack reached either a right or left position in FIG. 3, depending upon actuation of the handle 18 for shaft 16, it will actuate the required solenoids to effect the kind of shifting at hand.

Having thus described my invention and the advantages thereof, I do not wish to be limited to the details herein disclosed, otherwise than as set forth in the claims, but what I claim is:

1. A dash-mounted, manual gear shift actuator for outboard motors comprising a bracket adapted for mounting on a dashboard of a boat, a gear shift lever in the form of a rod extending through the bracket and dashboard and projecting to both sides of the dashboard, a base means mounting said base on said dashboard at the forward aspect thereof in substantially concealed position, a rack-like member mounted for rectilinear motion on said base, means for moving said rack in either direction, said rack moving means being connected with respect to said rod for motion thereby, and a detachable connection from said rack-like member to a cable for securement to the usual shift on the conventional outboard motor.

2. A control for shifting gears for outboard motors, said control comprising an oscillatable rod, means to mount the rod on the boat in convenient location, a sleeve on said rod, a base mounted on said sleeve, said sleeve being adapted to be fixed to the boat, a reciprocable member slidably guided on said base, means to move said reciprocable member in either direction, said means being attached to said rod, and a detachable connection from said reciprocal member for connection to the control on the outboard motor.

3. A control device for an outboard motor comprising a rod, a base, means mounting the base on a boat, a detachable and replaceable panel on said base, a guideway in the panel, said guideway being adapted to slidably receive a rectilinearly movable member, a rectilinearly movable member in said guideway, means attaching said member to the cable of a gear shift for an outboard motor, means to move said rectilinearly movable member, said means being connected to the rod for actuation thereby, and means to mount the bracket in desired position on said boat.

4. A device as described in claim 3 wherein said rectilinearly movable member is a rack, and the means for moving the same comprises a sector gear.

5. The device as recited in claim 4 wherein said rectilinearly movable member is a rack and the means for moving it includes a sector gear and an intermediate spur gear meshing with said rack and the sector gear.

6. A dashboard mounted operated means for shifting gears in an outboard motor including a bracket, means mounting said bracket on the dashboard of a boat, said dashboard and bracket being correspondingly apertured, a rod in said apertures, a handle at one end of said rod, a gear or the like at the other end of said rod, a sleeve surrounding said rod and mounted on said bracket, a base on said sleeve, a removable and replaceable rack on said base, means guiding the rack on said base, the gear operating said rack as the rod is actuated, and a detachable connection from the rack to the cable for the conventional gear shifting means of the outboard motor.

7. A dashboard mounted operated means for shifting gears in an outboard motor including a bracket, means mounting said bracket on the dashboard of a boat, said dashboard and bracket being correspondingly apertured, a rod in said apertures, a handle at one end of said rod, an actuator at the other end of said rod, means mounting said rod on said bracket, a base on said means, a removable and replaceable member on said base, means guiding the member on said base, the actuator operating said member as the rod is actuated, and a detachable connection from the member to the cable for the conventional gear shifting means of the outboard motor.

References Cited in the file of this patent

UNITED STATES PATENTS

| | | |
|---|---|---|
| 705,028 | Broluska | July 22, 1902 |
| 952,759 | Schuchardt | Mar. 22, 1910 |
| 1,619,389 | Winters | Mar. 1, 1927 |
| 2,351,172 | White | June 13, 1944 |
| 2,683,991 | Cutsinger et al. | July 20, 1954 |
| 2,757,553 | Marr | Aug. 7, 1956 |
| 2,871,717 | Gerstner | Feb. 3, 1959 |
| 2,890,595 | Loeffler | June 16, 1959 |

FOREIGN PATENTS

| | | |
|---|---|---|
| 708,961 | France | May 5, 1931 |